3,036,109
PREPARATION OF DIALKYL PHOSPHITES

Edward N. Walsh, Chicago Heights, Ill., assignor to Victor Chemical Works, Chicago, Ill., a corporation of Illinois
No Drawing. Filed Mar. 30, 1959, Ser. No. 802,657
13 Claims. (Cl. 260—461)

This invention relates to a new method for making dialkyl phosphites. More specifically, this invention relates to an improved method for making dialkyl phosphites wherein high yields may be obtained along with little, if any, loss of by-product materials.

Many prior processes are known for the manufacture of dialkyl phosphites. These processes, however, are based upon the reaction

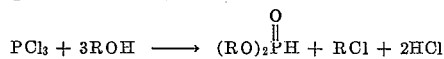

and as such are subject to severe economic disadvantages. The principal disadvantage is the loss of one mole of alkyl chloride for each mole of dialkyl phosphite produced. A second disadvantage is that the HCl produced tends to attack the dialkyl phosphite product, thereby reducing the yield and at the same time forming more alkyl chloride.

In view of these difficulties, prior processes for making dialkyl phosphites have had two principal objectives in mind. One objective has been the quick and efficient removal of HCl to prevent attack on the dialkyl phosphite product, and the other objective has been the recovery of the low boiling alkyl chloride. In an effort to satisfy these objectives, inert, low boiling solvents, special refrigerants, special vacuum techniques, and various HCl acceptors have been used. These specialized or modified methods involve additional time and expense.

This invention provides a method that enables one to produce dialkyl phosphites without producing an alkyl halide or hydrogen chloride as by-products, thereby obviating the removal and recovery problems that have been associated with prior methods.

My invention provides for the preparation of dialkyl phosphites by a method which may be illustrated as follows:

wherein Ar is an aromatic group such as a phenyl (includes groups having a phenyl group therein, and nuclear substituted phenyl groups such as p-chlorophenyl, p-nitrophenyl, and cresyl) group, and R is an aliphatic group such as an alkyl (includes substituted alkyl groups such as dichlorobutyl, trichloroethyl, and 2-ethylhexyl) group. Ar and R, as well as phenyl and alkyl, are hereinafter intended to have the significance assigned above.

Further, my method may also be used to prepare mixed dialkyl phosphites, such as follows:

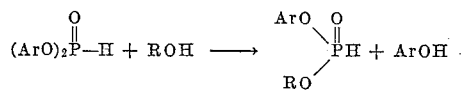

and

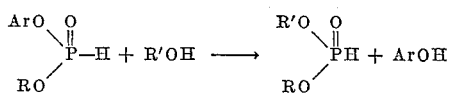

wherein R' is an aliphatic group such as an alkyl (includes substituted alkyl) group.

My method functions particularly well, and thus represents a preferred embodiment thereof, when the alkyl alcohol used boils at a higher temperature than the aryl alcohol that is produced with the phosphite product. In such cases, the reaction is driven to completion by boiling off the more volatile aryl alcohol. Thus, I prefer using alkyl alcohols having at least eight carbon atoms, preferably 8 to 20 carbon atoms. However, it has been found that lower alkyl alcohols such as amyl alcohol may be used satisfactorily in my method, but the yields and quality of phosphite produced are considerably reduced therewith due to loss of the lower boiling alcohols. When using lower alkyl alcohols below amyl alcohol, the loss of one mole of alkyl halide, which occurs when using conventional processes, does not present the severe economic disadvantage which such a loss involves with the higher, more expensive alcohols.

The following examples will serve to illustrate my invention.

Example 1

A solution of 70.2 gms. of diphenyl phosphite and 80.0 gms. of 2-ethylhexanol was placed in a small flask equipped with a reflux condenser and a nitrogen inlet tube. The contents were kept under a stream of dry nitrogen and heated to 140° C. over a period of one hour. The resulting product was then cooled, placed under vacuum, and distilled. A forerun of phenol was first collected boiling at 44° C. under a pressure of 1 mm. of mercury. This phenol by-product solidified in the collecting flask. The di(2-ethylhexyl) phosphite remaining in the flask at 140° C. under 1 mm. of mercury pressure, weighed 87.9 gms. and had an index of refraction of $n_{25}D = 1.4457$. This represents a yield of 95.8% by weight of material, which was analyzed as 100.0% by weight di(2-ethylhexyl) phosphite and nil tri(2-ethylhexyl) phosphite by titration.

Example 2

Following the procedure of Example 1, above, 46.8 gms. of diphenyl phosphite and 164.0 gms. of technical lauryl alcohol were added to a small flask. The reaction mixture was heated to 100° C. for 20 minutes and then distilled. A forerun of 37.7 gms. of phenol was first collected, and then an intermediate cut of excess lauryl alcohol was collected at 68–120° C. under a pressure of 1.5 mm. of mercury. The remaining dilauryl phosphite weighed 92.8 gms. and had an index of refraction of $n_{25}D = 1.4521$. It analyzed 6.5% by weight P (theory 6.8%) and analyzed 94.2% by weight dilauryl phosphite by titration.

Example 3

Following the procedure of Example 1, above, a reaction flask was charged with 46.8 gms. of diphenyl phosphite and 108.1 gms. of stearyl alcohol. The mixture was heated to 106° C. for 20 minutes and then distilled. The phenol forerun was removed up to 160° C. at 2 mm. of mercury. The resulting distearyl phosphite weighed 115.0 gms. (98% yield) and solidified at 54–57° C.

An alternative method of producing dialkyl phosphites, which is intended to be included in this invention, involves the use of the process described and claimed in my copending application Serial No. 581,357, filed April 30, 1956, now U.S. Patent 2,984,680. My copending application shows a method for making diaryl phosphites from triaryl phosphites according to the following equation:

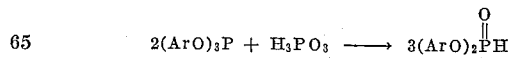

I have now found that it is possible to use the method of the present invention in combination with my previous invention in a manner such as follows:

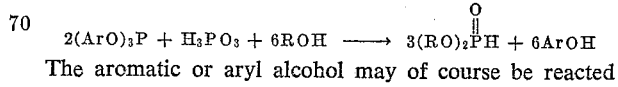

The aromatic or aryl alcohol may of course be reacted with more PCl₃ to form more (ArO)₃P according to well-known procedures. It is this recovery and reuse of the principal by-product which gives this process the advantage over prior processes which lose the alkyl halide. The following examples illustrate my invention when carried out in accordance with this modification.

*Example 4*

A reaction flask was charged with 128 gms. of mixed amyl alcohols, 62.0 gms. of triphenyl phosphite and 8.2 gms. of phosphorous acid. The mixture was stirred and heated to 100° C. over a 30 minute period. The phosphorous acid was observed to go into solution at 30° C. The mixture was held at 100° C. for an hour and then distilled. A forerun of amyl alcohol was collected followed by an intermediate cut of phenol boiling at 63–80° C. and 1 mm. of mercury pressure. The remaining product was distilled to give 50.2 gms. (75.5% yield) of product boiling at 85–87° C. at 1 mm. of mercury. This product was analyzed and found to be a mixture of diamyl phosphite and some diphenyl phosphite.

*Example 5*

A solution of 62.0 gms. of triphenyl phosphite in 156.0 gms. of 2-ethylhexanol was stirred at 20–25° C., while 8.2 gms. of phosphorous acid was added over a 33 minute period. The mixture was then warmed to 100° C. over a 26 minute period. The phosphorous acid was all dissolved at 45° C. The mixture was stirred an additional hour at 100° C., cooled and distilled. After removal of a forerun of phenol, the di(2-ethylhexyl) phosphite remaining at 150° C. and 1 mm. of mercury, weighed 79.1 gms. (86.3%) and had an index of refraction of $n_{25}D=1.4473$.

The ordinary commercial grade of raw materials is suitable for performing the above reactions in accordance with my invention. The compounds used are readily available and no special purification is required.

The temperatures at which my reaction proceeds are not critical and may be varied widely. Ordinarily, a range of from 60–150° C. may be used satisfactorily. The reaction will proceed at lower temperatures but at a slower rate, which may make such temperatures economically undesirable. At temperatures near about 190° C., decomposition of the alkyl phosphites occurs with a resulting loss in yield.

Stoichiometric quantities of reactants have been found to give the best results. Up to 500% excess alkyl alcohol has been used satisfactorily, but better results are obtained with near stoichiometric amounts. Since less than stoichiometric amounts of alkyl alcohol result in mixed alkyl aryl phosphites, it is best to have at least a small excess of the alkyl alcohol to avoid this.

I prefer to conduct my method using an atmosphere of dry nitrogen, but this is not necessary. Product yields and the quality of the phosphite product may be reduced slightly if nitrogen is not used, but the basic reaction is unaffected.

The dialkyl phosphites produced by my method are valuable flameproof resin components, as pointed out in U.S. Patent 2,824,085. In addition, they are also valuable chemical intermediates. For example di(2-ethylhexyl) phosphite may be chlorinated to di(2-ethylhexyl) phosphorochloridate according to the following reaction:

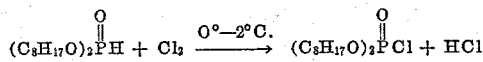

This phosphorochloridate, in turn, may be hydrolyzed to di(2-ethylhexyl) phosphoric acid as follows:

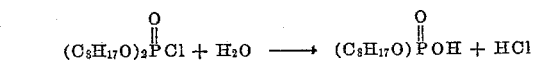

This dialkyl phosphoric acid product is well known as a metal extracting compound, as illustrated in U.S. Patent 2,733,200. Other phosphorochloridates and acids may be made in a similar manner which have a wide variety of uses.

The foregoing detailed description has been given for clearness of understanding only, and no unnecessary limitations should be understood therefrom as modifications will be obvious to those skilled in the art.

What is claimed is:

1. The method of producing dialkyl phosphites comprising reacting a member of the group consisting of (*a*) diphenyl phosphites, and (*b*) triphenyl phosphites plus phosphorous acid, with at least a substantially stoichiometric amount of alkyl alcohol, and recovering the resulting dialkyl phosphite.

2. The method of claim 1 wherein said alkyl alcohol includes two different alkyl alcohols and the recovered dialkyl phosphite includes mixed dialkyl phosphites.

3. The method of producing dialkyl phosphites comprising reacting a diphenyl phosphite with at least a substantially stoichiometric amount of alkyl alcohol, and recovering the resulting dialkyl phosphite.

4. The method of claim 3 wherein the alkyl group of the alkyl alcohol contains at least 5 carbon atoms.

5. The method of claim 3 wherein the alkyl moiety of the alkyl alcohol contains 8–18, inclusive carbon atoms.

6. The method of producing dialkyl phosphites comprising reacting substantially 2 moles of a triphenyl phosphite and substantially 1 mole of phosphorous acid and at least about 6 moles of alkyl alcohol, and recovering the resulting dialkyl phosphite.

7. The method of claim 6 wherein the alkyl moiety of the alkyl alcohol contains at least 5 carbon atoms.

8. The method of claim 6 wherein the alkyl moiety of the alkyl alcohol contains 8–18, inclusive, carbon atoms.

9. The method of producing mixed phosphites comprising reacting substantially equal moles of a diphenyl phosphite and two different alkyl alcohols, and recovering a product having mixed dialkyl phosphites.

10. The method of producing dialkyl phosphites comprising reacting a triphenyl phosphite plus phosphorous acid with alkyl alcohol and recovering the resulting dialkyl phosphite.

11. The method of claim 10 wherein said alkyl alcohol includes two different alkyl alcohols and the recovered dialkyl phosphite includes mixed dialkyl phosphites.

12. The method of claim 10 wherein the alkyl group of the alkyl alcohol contains at least five carbon atoms.

13. The method of claim 10 wherein the alkyl moiety of the alkyl alcohol contains 8–18, inclusive, carbon atoms.

References Cited in the file of this patent

UNITED STATES PATENTS 2,326,140    Gzemski _____ Aug. 10, 1943

OTHER REFERENCES

Arbuzov et al.: "Bull. Acad. Sci. U.S.S.R., Div. chem. Sci.," (English Trans.) pp. 485–9 (1952).